Oct. 5, 1965   R. P. LATHROP   3,209,584
APPARATUS FOR FATIGUE TESTING
Filed Nov. 15, 1962
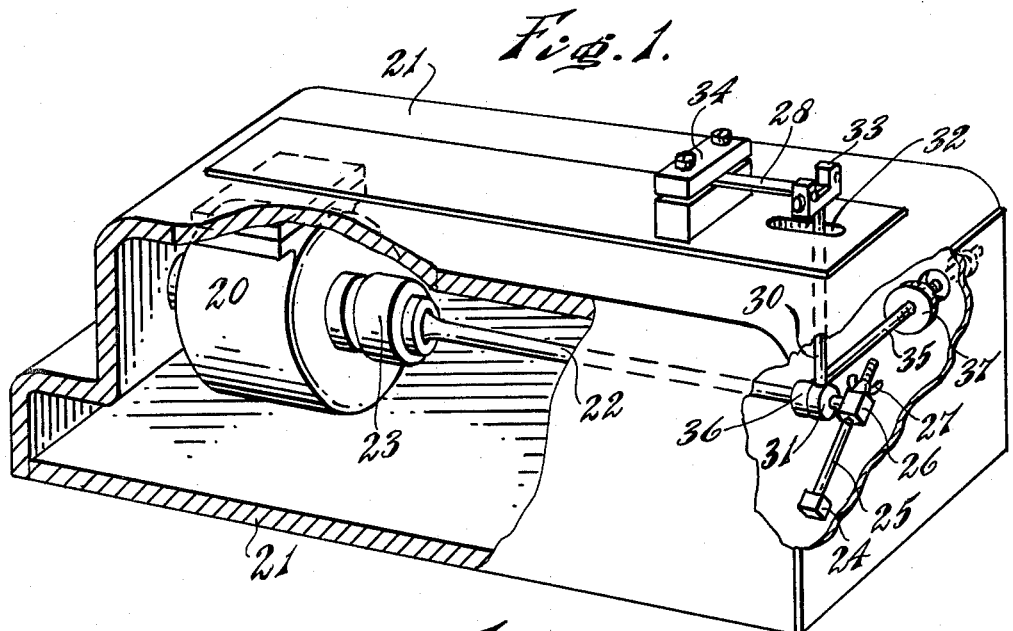
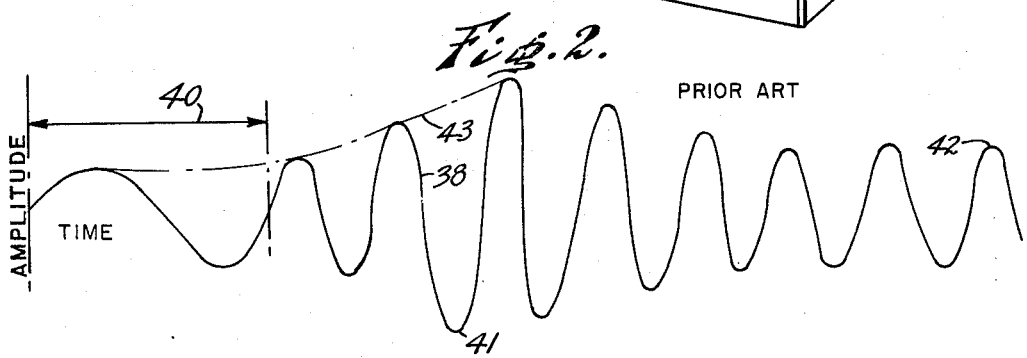
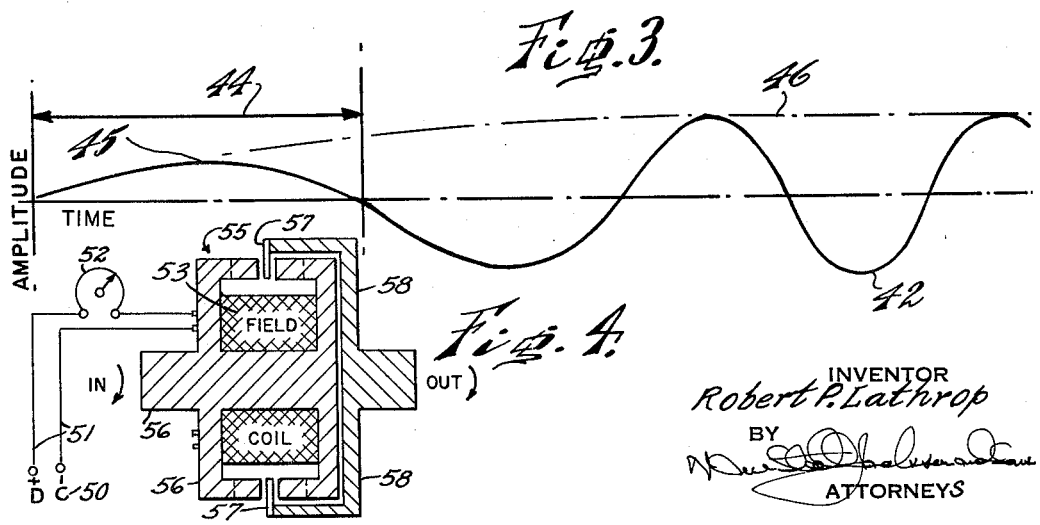
INVENTOR
Robert P. Lathrop
BY
ATTORNEYS

United States Patent Office 3,209,584
Patented Oct. 5, 1965

3,209,584
APPARATUS FOR FATIGUE TESTING
Robert P. Lathrop, Berwyn, Pa., assignor, by mesne assignments, to Warner & Swasey Company, Cleveland, Ohio, a corporation of Ohio
Filed Nov. 15, 1962, Ser. No. 237,989
3 Claims. (Cl. 73—100)

The present invention relates to a fatigue testing machine for subjecting a system to controlled and reproducible mechanical vibratory force and to a method for producing same.

A purpose of the invention is to eliminate undesirable starting transients in a fatigue testing machine wherein the starting amplitude greatly exceeds the operating amplitude.

A further purpose is to increase gradually the amplitude of the vibratory force applied to a test specimen from a state of rest to the operating amplitude.

A further purpose is to eliminate starting transients which could be applied to the test item, thereby complicating the analysis of the test results.

A further purpose is to maintain force or deflection in the test item within stated limits throughout the duration of the test.

A further purpose is to eliminate the need to damp the machine physically to reduce the starting transient.

A further purpose is to reduce the amplitude of the starting transient by reducing the acceleration of the machine.

A further purpose is to use a hysteresis synchronous motor capable of completely controlled acceleration to synchronous speed.

Further purposes appear in the specification and in the claims.

In the drawings I have chosen to illustrate one only of the numerous embodiments in which my invention may appear, selecting the form shown from the standpoint of convenience in illustration, satisfactory operation, and clear demonstration of the principles involved.

FIGURE 1 is a perspective view partially broken away of a fatigue testing machine embodying the invention.

FIGURE 2 is a graph showing the amplitude as ordinate and time of the vibratory force or displacement as abscissa, imparted to the test specimen in the prior art.

FIGURE 3 is a graph showing the amplitude as ordinate and time of the vibratory force or displacement as abscissa, imparted to a test specimen using the present invention.

FIGURE 4 is a schematic view of a hysteresis clutch and voltage control according to the invention.

Describing in illustration but not in limitation and referring to the drawings:

In the prior art extensive use is made of fatigue testing machines of the inertia-force compensated mechanical reaction type wherein the forces exciting the vibrations are generated by rotating or reciprocating unbalanced masses, especially of a mechanical direct drive. In one form, the machine may consist, for instance, of a table which for vibration isolation is suspended from a mounting frame attached to the floor. The unbalanced masses which are attached to a shaft are part of a reciprocating platen which is spring mounted on the floating table assembly. A separate motor secured to the table, which is attached to the mass shaft assembly of the reciprocating platen by a flexible coupling, drives the system. This type of machine is shown, for instance, in the patent to Lazan 2,486,567. Another form of machine which uses an elongated shaft having an unbalanced weight is directly rotated from an anchored excitor motor as illustrated and explained in detail in Lazan Patent 2,591,444.

Inertia force compensated fatigue testing machines of the type involved in the present invention, as well as the theory and operation of such machines, are described by H. J. Gaugh and H. V. Pollard in Proceedings of the Institute of Mechanical Engineers, volume 131, 1935, at page 7. This article includes a discussion of the relation of the motor synchronous speed to the resonance of the system.

Considerable difficulty has been encountered from time to time in machines of this type upon starting. It has been found that when relatively soft specimens are tested in the machine, a starting transient is created wherein the starting amplitude often rises to as much as nearly twice the required or operating amplitude. This is shown graphically in FIGURE 2. This transient is analogous to the condition created, for instance, when a weight is applied to a common undamped spring scale. The weight, which is in effect a disturbing force, causes the spring to be well displaced beyond the equilibrium position. The spring will react by exerting a force in the opposite direction from the force exerted by the weight and a vibration results with the displacement or amplitude diminishing with each period until a normal or equilibrium displacement is achieved.

Efforts have been made in the past to reduce this starting transient by reducing the acceleration of the frequency with which the force is applied. These attempts to increase gradually the frequency of the operation by gradually bringing the unbalanced mass to synchronous speed have included friction clutches arranged between the excitor motor and the centrifugal offset shaft, large flywheels on the motor shaft and on the offset shaft, and voltage controls. These attempts have all been generally unsatisfactory in reducing the starting transients.

I have discovered that starting transients are relatively unaffected by any control of the speed up to approximately 98 or 99% of the operating speed of the motor, or to within 20 or 30 r.p.m. of the motor synchronous speed in, for instance, an 1800 r.p.m. motor and that the starting transient is not created during the initial acceleration to the first approximately 98 or 99% of the operating r.p.m. of a conventional synchronous motor. I have further discovered that the starting transient is created during the acceleration of the motor through approximately the last 1% or 2% of speed increment to the operating synchronous speed. I have further found that motor acceleration during this critical period may be controlled by the use of a hysteresis synchronous motor, which when coupled with suitable voltage control, utilizes the phenomenon of hysteresis to produce controlled mechanical torque, and acceleration. A suitable voltage control can be, for instance, a rheostat.

I have further found that the prior art attempts were controlling the frequency acceleration in the area where there was no effect on starting transient, and that the means used were ineffectual in controlling the frequency during the last approximately 1% or 2% below synchronous speed which do affect the starting transient.

In FIGURE 1, I show one form of a fatigue testing machine having an electrical motor 20 secured to a housing 21 by bolts or the like. A horizontal shaft 22 constitutes in effect an appreciable extension of the motor shaft and is fixed to the motor shaft by fixed coupling 23. Secured to the end of the shaft is a centrifugal force producing eccentric weight 24 which is formed on a screw 25 threaded through a shaft hub 26. The radius of the weight and therefore the centrifugal force produced thereby is adjusted by rotating the screw about its own axis to move the weight in or out. A thumb nut 27 locks the screw in any selected position.

As the weight revolves, its centrifugal force causes the shaft to bend so that the shaft end would move in a circle except for the use of means to be described later which restrains the shaft in a lateral direction only, thereby allowing complete freedom of alternate bending in a vertical plane. The centrifugal force is transmitted to the specimen 28 by a rod 30 preferably threaded throughout its length and connected to the shaft by a bearing 31. The upper end of rod 30 passes through a slot 32 running lengthwise of the machine in the top of housing 21 and is adjustably threaded into a specimen loading yoke 33. The inner end of the specimen 28 is clamped in a stationary clamp 34 secured to the housing 21.

To restrain lateral movement of the shaft 22 during rotation of the eccentric weight 24, a radius or guiding link 35 has a bearing 36 at one end journalled on the shaft 22 alongside of bearing 31. The other end of the radius link 35 passes through an enlarged opening 37 in the housing and then to a horizontal rocker shaft, not shown. Link 36 is therefore capable of oscillation in a vertical plane about its rocker shaft as a center, thereby restraining lateral movement of shaft 22.

In operation, the specimen 28 is clamped in position for flexing and the electric motor 20 rotates flexible shaft 22 together with eccentric weight 24 which is attached thereto. The rotation of eccentric 24 produces at the free end of flexible shaft 22 a centrifugal force which were it not for the presence of lateral guide link 35 would cause the free end of flexible shaft 22 while rotating to describe a circle, carrying with it through such circle rotating eccentric 24 and the lower end of vertical connecting rod 30. However, the presence of link 35 causes the lateral component of said centrifugal force to be resisted and in effect eliminated leaving evident only the vertical component thereof. The motion of the free end of flexible shaft 22 is essentially and practically vertical. This vertical component of said centrifugal force produced by the rotation of eccentric 24 is transmitted through bearing 31, causing the specimen whose other end is immovably held by clamping block 34 to be alternately flexed with a reversed bending load during each revolution of the motor shaft first in an upward direction and then in a downward direction.

The unloaded machine normally operates in resonance, that is, the mass, $m$, of the reciprocating parts and the stiffness, $k$, of the flexing shaft are adjusted so that they satisfy the expression $$\omega = \sqrt{\frac{k}{m}}$$

where $\omega$ is the rotational frequency of the synchronous motor. In this way the inertia forces of the reciprocating parts are exactly balanced by opposing spring forces. When a specimen is inserted, the machine then operates below resonance due to the added resistance of the stiffness of the test specimen, with only a known alternating force being applied to the specimen. If the specimen is not considerably stiffer than the restoring spring force, $k$, in the machine, the machine will operate close to resonance and the starting transient will be amplified even though the steady state force may not be affected.

In order to achieve the desired controlled frequency of steady operation, salient pole synchronous motors have been used to rotate the elongated shaft and eccentric mass. Prior art fatigue testing machines, in starting and then in subsequently operating at synchronous speed, yield a starting transient as indicated at 38 in FIGURE 2. The starting frequency application of the load has been plotted along the abscissa and, because of the rapid acceleration near synchronous speed, is virtually equal to the operating frequency. The period of a load application 40 corresponds to a rotation of the motor. It will be seen that there is a starting amplitude 41 which is considerably higher than the operating amplitude 42. A smooth curve 43 drawn through the maximum of the wave form shows the starting transient.

I have discovered that by using a hysteresis synchronous motor as an electrical motor 20, I can reduce the starting transient 38 to any desired value. This is done by decreasing the motor acceleration near synchronism to a value below that where the rate of introduction of transient is less or only very slightly more than the rate of damping of the oscillating system. The machine operator visually observes the displacement of the specimen, and upon any appearance of a starting transient, reduces the acceleration by controlling the voltage until the transient is dampened. By the use of a hysteresis synchronous motor 20, which is powered through a voltage regulator 10, having a voltage control knob 11, the amplitude is gradually increased as shown in FIGURE 3. The control of the acceleration during the last 1% or 2% of rise into synchronous speed results in an increased period 44 and reduced frequency as plotted on the ordinate with a resulting reduced amplitude 45. As the speed of the motor is gradually brought into operating or synchronous speed, through increase of voltage as controlled by the voltage regulator 10, the amplitude gradually increases to the operating amplitude with a minimum of overshoot as shown by curve 46.

The particular construction of a hysteresis type motor is a synchronous motor without salient poles and without direct current excitation. The motor starts by virtue of the hysteresis losses induced in a hardened steel secondary member by the revolving field of the primary and operates normally at synchronous speeds due to the retentivity of the secondary core. The hysteresis synchronous motor utilizes the phenomenon of hysteresis to produce mechanical torque.

When properly designed, the hysteresis synchronous motor develops torque approximately proportional to excitation voltage right up to synchronous speed. This feature allows control of the motor speed in the range directly below synchronous speed. This is in contrast to a salient pole synchronous motor which must suddenly accelerate into synchronism from the induction motor torque speed characteristics.

Details of hysteresis motor construction and operation are described in "Standard Handbook for Electrical Engineers," edited by A. E. Knowlton, 7th Ed., 1941, page 739, and in "Fractional Horsepower Electric Motor," by C. G. Veinott, 2nd Ed., 1948, pages 361–362.

The hysteresis motor rotor is a smooth cylinder without fixed poles. This makes it possible to obtain a gradual pole slippage with a gradual acceleration right up until synchronous speed is achieved. In salient pole motors, used in the prior art, the poles are fixed on a rotor, and the rotor grabs onto the rotating field and jumps past the small speed increment right before synchronous speed. The gradual increase through the last percent of speed increase in a hysteresis motor is obtained by controlling, in any well known manner, the voltage imparted to the motor.

In an alternative embodiment of the invention, I replace the hysteresis synchronous motor as described above with a unit comprising a hysteresis clutch coupled to a synchronous motor. The structure and operation of a hysteresis clutch are well known and correspond to the characteristics and behavior obtainable in a hysteresis synchronous motor. A detailed description of such a clutch is set forth in Technical Data Sheet 961 published by the Scanner Corporation of America. The hysteresis clutch can be controlled in the same manner as the hysteresis motor to yield a controlled acceleration.

A hysteresis clutch and voltage regulator are shown in FIGURE 4. A source of direct current 50 passing through conductors 51 and rheostat 52 to the field coil 53 of a hysteresis clutch 55. The field 53 is fixed on the input section 56 of the clutch. A ring of high hysteresis material 57 is fixed on the driven section 58.

In operation the field coil 53 rotates and induces a magnetic flux into ring 57. The coercive force of the high hysteresis material resists the change of magnetization and results in a torque being applied to the driven member 58. The amount of torque is proportional to the control current in the coil 53, which is controlled by rheostat 53.

In view of my invention and disclosure, variations and modifications to meet individual whim or particular need will doubtless become evident to others skilled in the art, to obtain all or part of the benefits of my invention without copying the structure and method shown, and I, therefore, claim all such insofar as they fall within the reasonable spirit and scope of my claims.

Having thus described my invention what I claim as new and desire to secure by Letters Patent is:

1. In an inertia-force compensated fatigue testing machine having centrifugal weight means for imparting a repeated reversed load to a specimen, hysteresis drive means for rotating the centrifugal weight means, an electrical supply circuit for the hysteresis drive means, and voltage control means in the electrical circuit wherein the acceleration of the frequency of the reversed load imparted to the test specimen is controlled to reduce starting transients by controlling the voltage imparted to said drive means.

2. A machine of claim 1, wherein the hysteresis drive means comprises a hysteresis synchronous motor.

3. A machine of claim 1, wherein the hysteresis drive means comprises a hysteresis clutch.

References Cited by the Examiner
UNITED STATES PATENTS

| | | | |
|---|---|---|---|
| 2,486,567 | 11/49 | Lazan | 73—71.5 |
| 2,591,444 | 4/52 | Lazan | 73—91 |
| 2,844,777 | 7/58 | Ross. | |
| 2,853,667 | 9/58 | Booth et al. | |

RICHARD C. QUEISSER, *Primary Examiner.*